Patented Oct. 17, 1922.

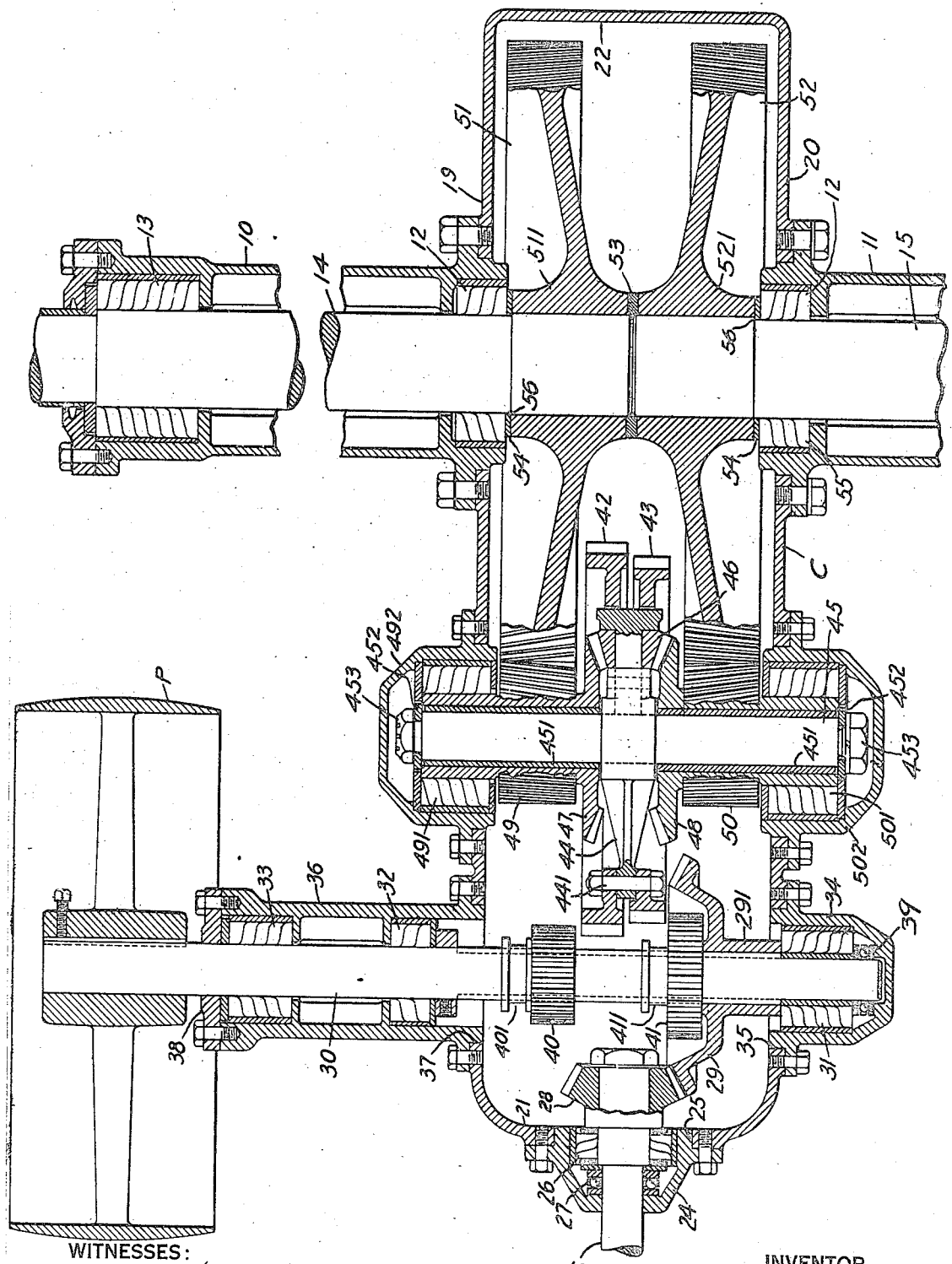

1,431,960

UNITED STATES PATENT OFFICE.

LESTER H. KEIM, OF CHICAGO, ILLINOIS, ASSIGNOR TO R. D. NUTTALL COMPANY, A CORPORATION OF PENNSYLVANIA.

TRANSMISSION MECHANISM.

Application filed February 1, 1918. Serial No. 214,812.

*To all whom it may concern:*

Be it known that I, LESTER H. KEIM, a citizen of the United States, and a resident of Chicago, in the county of Cook and State of Illinois, have invented a new and useful Improvement in Transmission Mechanisms, of which the following is a specification.

This invention relates to transmission mechanisms for self-propelling vehicles, such as tractors and trucks.

One of the objects of this invention is to provide a simple and rugged transmission mechanism for use on vehicles, such as farm tractors, where the parts of the machine are subject to very severe strains.

Another object of the invention is to provide a compact transmission mechanism that comprises a power pulley shaft, change-speed gearing, reversing gearing, differential mechanism, and final driving gears all enclosed within a casing that serves to exclude dust from the gears and their bearings and also to contain the lubricating oil in which the gears run.

Another object of this invention is to provide a helical pinion-and-gear reduction gearing by means of which a large reduction ratio and a symmetrical construction may be obtained without sacrificing strength or efficiency.

Another object of the invention is to provide a transmission mechanism in which the differential mechanism, instead of being mounted on the rear axle, is carried by a counter-shaft and has its differentially-connected elements connected to the rear drive axles by two similar sets of gears, the differential and the sets of gears being symmetrically disposed with respect to the central vertical longitudinal plane of the gear casing to avoid unequal strains on the gear casing and parts carried by it.

Another object is to provide a "live axle" drive, in other words, to drive the tractor wheels directly through their two axles without interposing the usual bull pinions and gears.

The above and other objects, and the novel features of the invention will be apparent from the following description taken in connection with the drawing, in which the single figure is a horizontal, sectional view of a transmission mechanism embodying my invention.

I have shown the apparatus as designed for application to a common form of farm tractor. A pair of rear-axle bearing sleeves 10 and 11 each carries inner roller bearings 12 and outer roller bearings 13 that rotatably support coaxial rear axles 14 and 15, the outer ends of which may have the tractor wheels (not shown) secured thereto. A propeller shaft S that is connected to an engine, not shown, extends into the front end of a transmission casing C.

The transmission casing C is an elongated trough-like container that may be supported, at its front end, upon a vehicle frame, is supported at its rear end upon the axles 14 and 15.

The casing C has two parallel side walls 19 and 20, front and rear walls 21 and 22, and a bottom wall that merges, at its front and rear ends, into the walls 21 and 22. A cap 24 is bolted to the front wall 21 and closes an opening 25 therein. The cap 24 carries suitable radial bearings 26 and end thrust bearings 27 to support the end of the propeller shaft S that projects into the casing. The inner end of the propeller shaft has a bevel pinion 28 secured thereto, which is adapted to be withdrawn, with the shaft 25, through the opening 25 when the cover 24 has been removed.

The bevel pinion 28 meshes with a bevel gear 29 keyed to a driving shaft 30 that is rotatably mounted in bearings 31, 32 and 33 and carries a pulley P keyed to its outer end. The bearing 31 is disposed in a cap 34 bolted over an opening 35 in the side wall 20 of the casing. The bearings 32 and 33 are carried by a bearing sleeve which has one end bolted around an opening 37 in the side wall 19 of the casing C and the other end supported by a side member of the frame F. The shaft 30 projects through a cap 38 at the outer end of the sleeve 36, and the inner end of this shaft projects into the cap 34 and into an end thrust bearing 39. The bevel gear 29 has an extended hub 291 that serves to hold the bearings 31 in place in the cap 34.

The driving shaft 30 has a low-speed pinion 40 and a high-speed pinion 41 splined thereon but movable longitudinally thereof into, and out of, mesh with the low and high-speed gears 42 and 43, respectively, by mechanism to be described later. The low and high-speed gears 42 and 43 are external gears of a differential mechanism that comprises a spider 44 mounted on a counter-shaft 45 and held in central position thereon by bronze bearing sleeves 451 that bear against the hub of the spider at their inner ends and, at their outer ends, against the washers 452 secured to the ends of the counter-shaft 45 by nuts 453 and suitable lock washers that fit on reduced threaded ends of the counter-shaft. The gears 42 and 43 are bolted to opposite sides of the rim of the spider 44 by bolts 441. The spider 44 also carries a plurality of bevel pinions 46 that are rotatable about radial axes on the spider and are in constant mesh with two differential bevel-gear elements 47 and 48 disposed co-axially with the spider 44. The elements 47 and 48 are similar and are each provided with an extended hub, the outer ends of which terminate adjacent the washers 452 and the inner ends of which abut against the opposite sides of the hub of the spider 44, the extended hubs having bearing on the bearing sleeves 451. A portion of each of the hubs on the gears 47 and 48 is toothed adjacent to the said gears, providing pinions 49 and 50 that are integrally connected to the gears 47 and 48, respectively, and disposed on opposite sides of the differential mechanism. The ends of the hubs beyond the pinions 49 and 50 have smooth cylindrical bearing surfaces supported by the bearings 491 and 501, carried in the caps 492 and 502 fitting in oppositely disposed openings in, and bolted to, the side walls, 19 and 20, respectively. The pinions 49 and 50 occupy substantially the entire space between the gears 47 and 48 and the walls 19, 20, respectively, and thereby limit the axial movement of the bearings 491 and 501 which support the ends of the hubs of the differential bevel gears. The caps holding these bearings are readily removable so that the latter may be easily inspected or renewed.

The pinions 49 and 50 mesh with two large gears 51 and 52, respectively, keyed to the rear axles 14 and 15, respectively. The pinions and gears 49 and 51, and 50 and 52 are constantly in mesh and may have spur teeth but they are preferably provided with co-operating single helical teeth, the teeth of the set 49 and 51 facing in the opposite direction to the teeth of the set 50 and 52 in order to balance the end thrusts on these sets of gearing. The hubs 511 and 521 are separated by a spacing ring 53 opposite the abutting ends of the shafts 14 and 15, and the spiders of these gears are sufficiently far apart so that a part of the differential mechanism may extend into the space between them, thereby economizing considerable space. The outer ends of the hubs 511 and 521 abut against rings 54 and hold the shaft bearings 12 in place in the annular grooves 55 at the inner ends of the bearing sleeves 10 and 11. The shafts 14 and 15 are slightly reduced, as at 56, to form shoulders that abut against the rings 54 and limit the outward movement of these shafts. Since the sleeves 10 and 11 are bolted to the side walls 19 and 20 of the casing, they may be readily detached and, therefore, the shafts may be easily assembled or disassembled.

The pinions 40 and 41 are provided with the annular grooves 401 and 411, respectively, to receive the ends of shift forks (not shown).

An important feature of my invention is the helical pinion-and-gear driving connections between the counter-shaft and the axles. The advantages of this construction are, (1) a large gear-reduction ratio is obtained with a minimum size pinion without sacrificing strength or efficiency, (2) greater strength and higher efficiency are obtainable with a helical gearing than with spur gearing, and (3) steadier driving effort and more quiet running is obtained with the helical gearing.

The operation of my combined change-speed and differential transmission mechanism will be apparent from the foregoing description. It will be apparent that all of the parts are accessible for inspection and repairs and, by completely enclosing them, they are less subject to wear, and may also be more perfectly lubricated. The arrangement also provides a mechanism in which the driving effort is transmitted from the engine substantially through the central longitudinal plane of the vehicle to the vehicle-propelling axles so that lateral strains on the vehicle and on the driving mechanism are substantially avoided. The pulley P is provided for driving farm machinery from the engine of the vehicle when the vehicle is stationary.

While I have shown and described details of construction, it is to be understood that various modifications may be made therein without departing from the invention, as set forth in the appended claims.

I claim as my invention:

1. In a differential mechanism, the combination with a shaft, of a spider rotatably mounted upon the shaft intermediate the ends thereof, a gear wheel mounted upon the periphery of the spider, bevel pinions mounted within the spider and having their axes in radial alinement with the said gear wheel, bearings for the ends of the shaft, a pair of sleeves surrounding the shaft and having their respective inner and outer ends abutting against the spider and extending into the said bearings, and means carried by the shaft for preventing movement longitudinally thereof by the sleeves, each of the said sleeves being provided with pinion teeth cut intermediate its ends and with a radially extending portion having gear teeth that mesh with the said bevel pinions.

2. In a differential mechanism, the combination with a shaft, of a spider rotatably mounted upon the shaft intermediate the ends thereof, a gear wheel mounted upon the periphery of the spider, bevel pinions carried by the spider, bearings for the ends of the shaft, a pair of sleeves surrounding the shaft and having their respective inner and outer ends abutting against the spider and extending into the said bearings, and means carried by the shaft for preventing movement longitudinally thereof by the sleeves, each of the said sleeves being provided with pinion teeth cut intermediate its ends and with a radially extending portion having gear teeth that mesh with the said bevel pinions.

In testimony whereof, I have hereunto subscribed my name this 15th day of Jan., 1918.

LESTER H. KEIM.